United States Patent [19]

Oliver et al.

[11] Patent Number: 4,887,794
[45] Date of Patent: Dec. 19, 1989

[54] BALL VALVE

[75] Inventors: John P. Oliver, Houston; Thomas F. Bright, Conroe, both of Tex.

[73] Assignee: Mogas Industries, Inc., Houston, Tex.

[21] Appl. No.: 266,001

[22] Filed: Nov. 2, 1988

Related U.S. Application Data

[63] Continuation-in-part of Ser. No. 236,597, Aug. 25, 1988, abandoned.

[51] Int. Cl.⁴ .............................................. F16K 5/06
[52] U.S. Cl. ..................................... 251/315; 251/185
[58] Field of Search ............... 251/180, 185, 314, 315, 251/363

[56] References Cited

U.S. PATENT DOCUMENTS 4,066,240  1/1978  Atkinson et al. ............... 251/185 X
4,099,705  7/1978  Runyan .......................... 251/315 X

FOREIGN PATENT DOCUMENTS 1154319   9/1963  Fed. Rep. of Germany ...... 251/315
1283624  11/1968  Fed. Rep. of Germany ...... 251/315
1006837   3/1983  U.S.S.R. ............................ 251/315

OTHER PUBLICATIONS

Brochure "Type C-1 Metal-To-Metal Ball Valves", Mogas Industries, Inc.
Page from brochure of Valvtron Industries relating to "Unitron" metal seated ball valves.

Primary Examiner—John Fox
Attorney, Agent, or Firm—Vaden, Eickenroht, Thompson & Boulware

[57] ABSTRACT

There is disclosed a ball valve which includes a ball closure rotatably mounted within a cavity formed in a main portion of the valve body and spring pressed against a seat ring on one side of the ball closure, and an end portion of the valve body which is removably connected to the main portion to close an opening from the end of the cavity through which the ball closure, seat ring and spring may be removed.

10 Claims, 7 Drawing Sheets

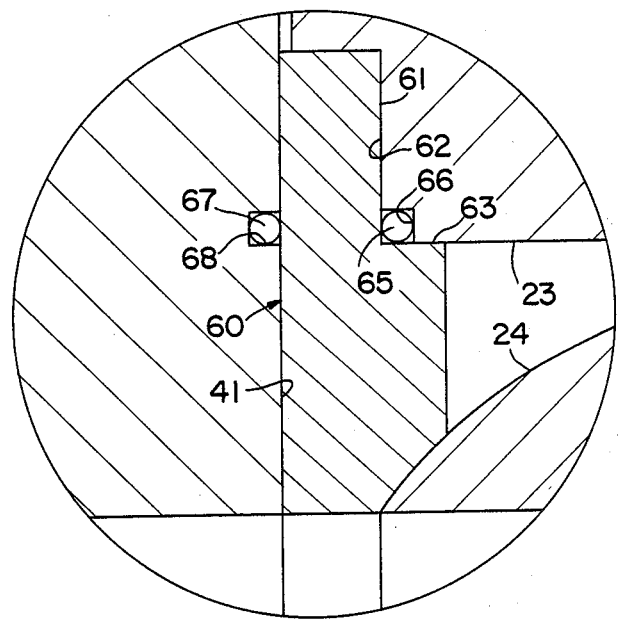
FIG.3
FIG.4
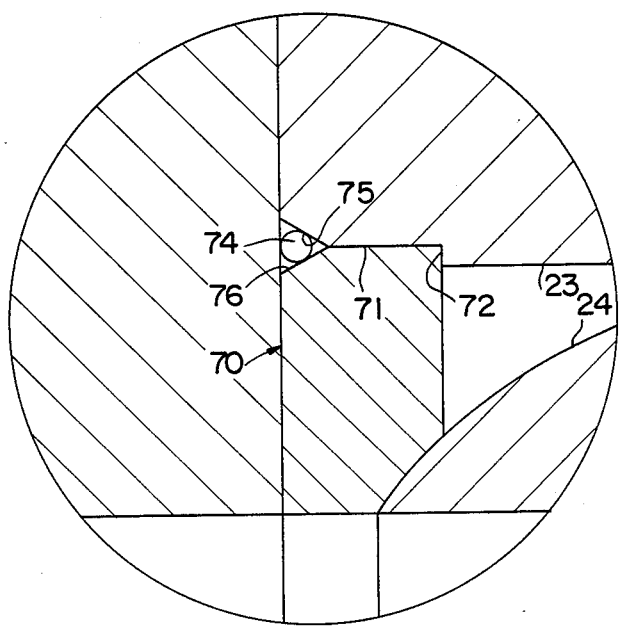

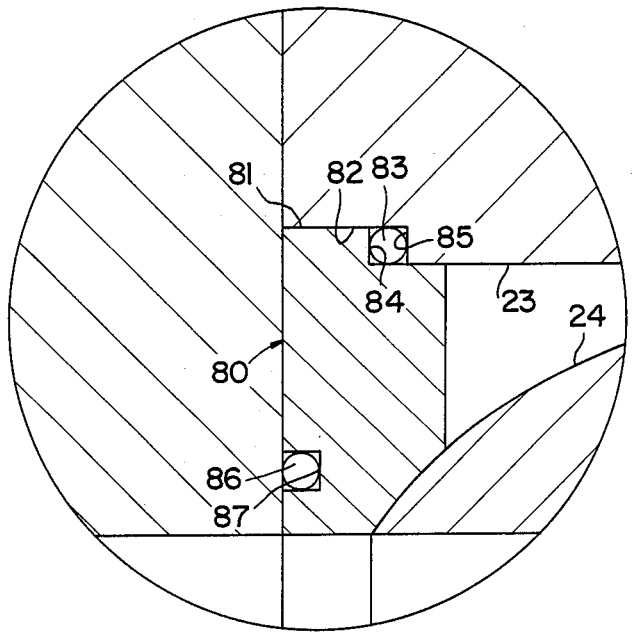
FIG. 5
FIG. 6
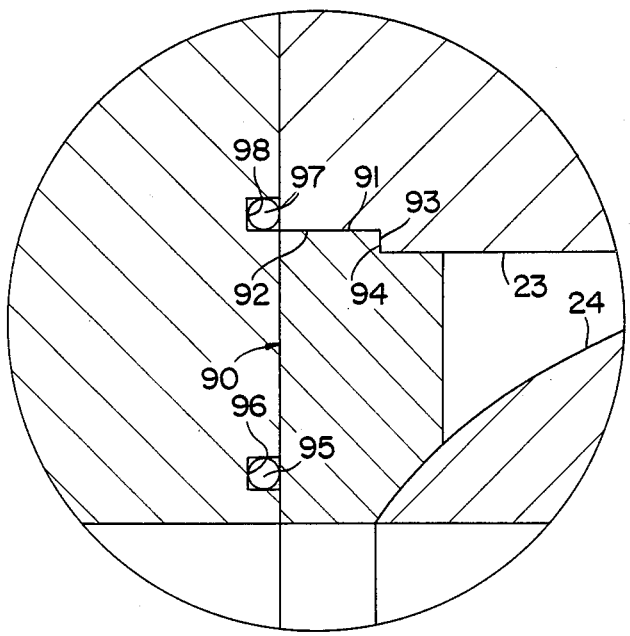

BALL VALVE

This application is a continuation-in-part of our co-pending application, Ser. No. 236,597, filed Aug. 25, 1988 now abandoned.

This invention relates generally to improvements in a ball valve of the type having a body with a removable end portion which permits the ball closure to be moved into and out of a seated position in the cavity of the main portion of the body to which the end portion is releasably connected. In one of its aspects, this invention relates to improvements in a valve of this type in which one side of the ball closure is spring pressed against a seating surface within the body and wherein the ball closure is moved between open and closed positions by a stem rotatably mounted in the main portion of the body having a tongue and groove connection with the ball closure which permits the ball closure to move axially when in closed position. Thus, the valve may be used in environments susceptible to large temperature fluctuations which might otherwise cause the stem and ball closure to bind, and further in highly corrosive environments as well as environments in which the line fluid contains debris which may require frequent repair of the parts of the valve.

The seating surface of this prior valve comprises a seat ring carried within a recess or pocket of the end portion of the body and whose inner end is lapped for metal-to-metal sealing engagement with the one side of the ball closure when in closed position, and whose outer end is also lapped for metal-to-metal sealing engagement with oppositely facing, lapped surface of the pocket of the end portion of the valve body. Still further, another seal ring carried within a recess in the cavity of the main body portion has a lapped surface which is urged into metal-to-metal sealing engagement with the other side of the ball closure by a Bellville spring acting between it and the cavity, as well as a lapped surface on its outer end for metal-to-metal sealing engagement with a lapped surface of the end of the recess.

Thus, the valve is capable of holding pressure in a direction toward the first seat ring as well as in a direction away from the first seat ring and toward the second seat ring when line pressure overcomes the force of the spring to permit the second seat ring to engage the seal surface of the recess. The seat rings cooperate with one another to hold the ball closure centered and the lapped surfaces on their inner ends are useful in "wiping" the ball closure and thus removing extraneous particles as the ball closure is opened and closed.

Although the seat ring and ball closure may be replaced in the field, the body must normally be returned to the shop to permit its seal surfaces to be remachined and relapped. This can be extremely time consuming and expensive when extreme conditions of corrosion and debris in the line require frequent replacement and/or repair.

There are also occasions in which the valve is installed with its first mentioned seat ring in an upper position. Depending on its strength, the spring may not be capable of supporting the weight of the ball closure so gravity can cause the seat ring to leave its sealing engagement with the body. Also, when pressuring against the seat with the spring, the first seat can, through vibration or gravity, separate from sealing engagement with the body. In such instances, the lapped surfaces on the outer end of the seat ring and recess in the body separate to permit debris to get between them and thus prevent their returning to sealing engagement.

The valve frequently is not used in an environment in which it must seal relatively high pressures in both directions. For example, it may be required to hold a differential pressure of no more than 200 p.s.i. or less in a direction away from the first mentioned seat ring, as for example during back flushing.

An object of this invention is to provide a valve of this type which is especially well suited for use in environments subject to extreme temperature fluctuations and corrosion and in which there is much debris in that the sealing surfaces of its body need not be relapped but instead merely cleaned and polished in the event the internal parts of the valve are to be replaced or repaired.

Another object is to provide such a valve which may be disposed in most any orientation without risk of opening a space between its seat ring and the opposite sealing surface of the valve body into which debris may enter.

A further object is to provide such a valve which, because it need not hold high differential pressures in both directions, may be of simplified construction requiring a spring pressed seat ring on only one side of the ball closure, but which is nevertheless of such construction that the ball closure is centered and urged against the one seat ring and periodically wiped as the ball closure is opened and closed and further in which there is no tendency for debris to accumulate between the spring and body recess in which it is received.

At least certain of these objects are accomplished, in accordance with the illustrated embodiments of the invention, by a valve of the type described wherein the seat ring against which the ball closure is spring pressed has an outer circumference which is closely received within the end opening in the cavity formed in the main portion of the valve body, and an outer end which is tightly engaged by the end face of the end portion of the body. The seat ring is sealed with respect to the valve body so as to prevent line fluid from passing between the end face of the end portion of the body and the end of the main body portion as well as to prevent line fluid from bypassing the seat ring when the ball closure is in closed position by sealing means which is confined between and compressed into sealing engagement with the seat ring and the body and confined between and compressed into sealing engagement with the body portions, as the end portion of the body is connected to the main portion thereof. More particularly, the outer circumference of said seat ring and the end opening in the body cavity have oppositely facing shoulders which limit axial inward movement of the seat ring to maintain said sealing means compressed into sealing engagement, thus enabling the valve to be oriented to most any position without the risk above mentioned.

Other objects are accomplished, in accordance with a preferred embodiment of the invention, by a valve of the type above described in which a spring ring is received within the cavity of the body with its outer diameter engaged with the main body portion and its inner diameter engaged with the ball closure, and which is flexed about its diameters as the end body portion is connected to the main body portion to urge the ball closure against the seating surface, thus serving to center the ball closure as well as yieldably urge the ball closure against the seat ring and wipe the ball closure as it moves between open and closed positions.

More particularly, the inner diameter of the spring ring is so related to the diameter of the ball closure and the end of the port therethrough that approximately two thirds or more of its inner diameter is engaged with the ball closure as the diameter of the end of the port in the ball closure passes the inner diameter of the spring ring during rotation of the ball closure between opened and closed positions. It has been found that this relationship between the ball closure and spring ring holds the ball closure centered and reduces any tendency for the ball closure to hang up on the spring ring thereby assuring smooth movement of the ball closure between open and closed positions. Preferably, the inner diameter of the spring ring is of such size relative to the ball closure that the angle included between lines drawn between the center of the ball closure and the intersection of a plane passing through the center and the intersections of the inner diameter of the spring ring with the ball closure is approximately ninety degrees (90°). This relationship has been found to further stabilize the ball closure by providing a desired balance of radial and axial components of force due to the spring ring as well as accommodating axial stack up of tolerances.

As in the case of the prior valve of this type, a valve constructed in accordance with the above described preferred embodiment of this invention will hold pressure in both directions. That is, depending on its design strength, the direct engagement of the inner and outer diameters of the spring ring with the ball closure and main body portion will hold at least a modest pressure in a direction away from the first seat ring. However, once the spring load of the spring ring is reached, its flexure may permit line fluid to leak past the first seat ring and into the body cavity about the ball closure and between the first seat ring and spring ring. If the inner and outer edges of the spring ring maintain sealing contact with the ball closure and body, this pressure may build up within the cavity to such an extent as to deflect the spring ring beyond its elastic limit and thus render it incapable of preloading and centering the ball closure.

In order to anticipate such a problem, while at the same time retaining the previously noted advantages of the preferred embodiment of the invention, one or more holes are formed in the spring ring to vent the pressure build up in the body cavity and thus avoid overloading of the spring. Preferably, each such hole is formed in the spring ring generally midway between its inner and outer diameters, and thus in the ring's minimal stress area.

In the drawings, wherein like reference characters are used throughout to indicate like parts:

FIGS. 3 to 7 are enlarged partial sectional views of alternative embodiments of the seat ring indicated by the circled portion A shown in FIG. 1;

Figure 1:
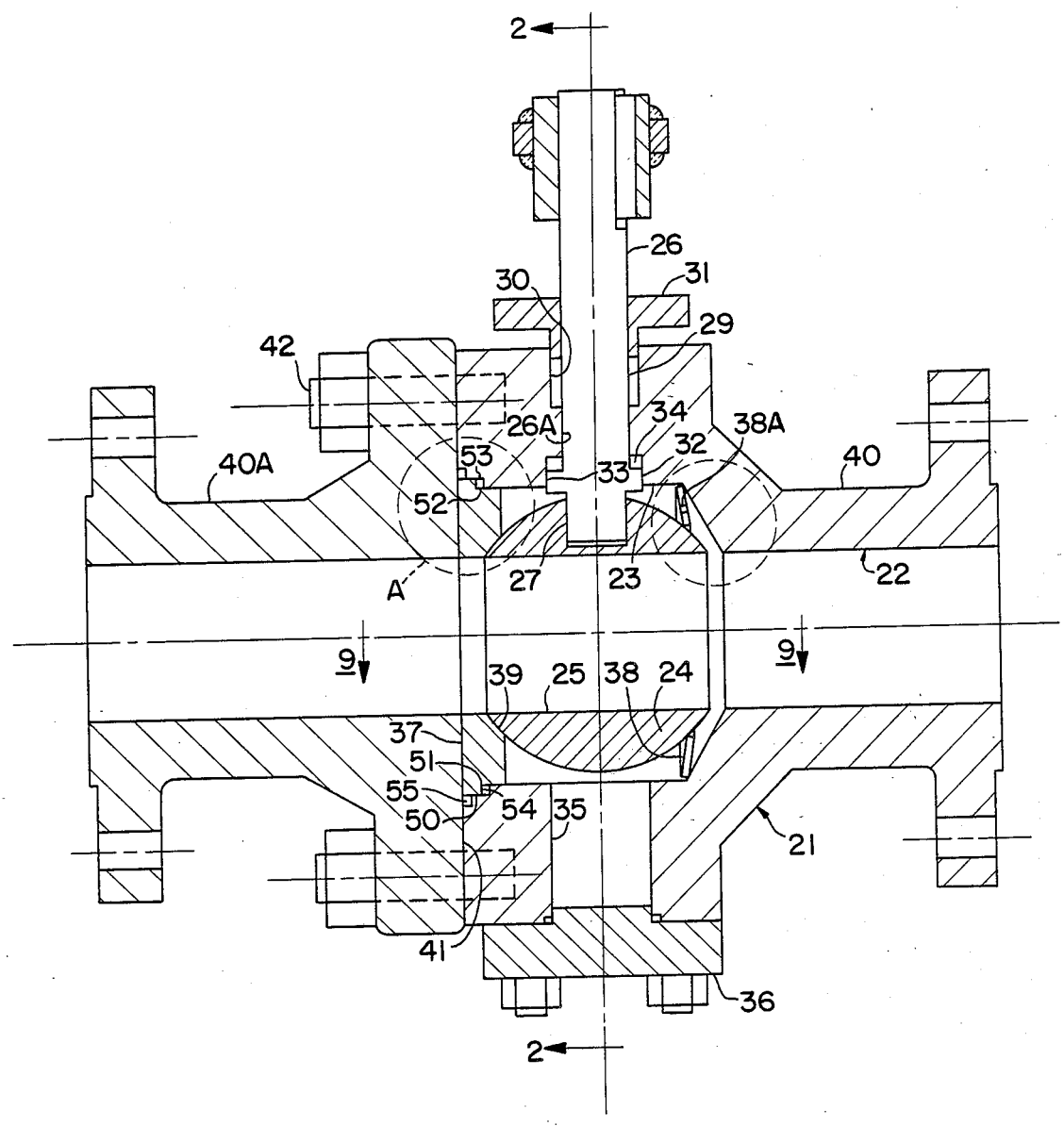
FIG. 1 is a longitudinal sectional view of a valve constructed in accordance with an illustrative embodiment of the present invention, and with the ball closure member thereof in open position.
Figure 2:
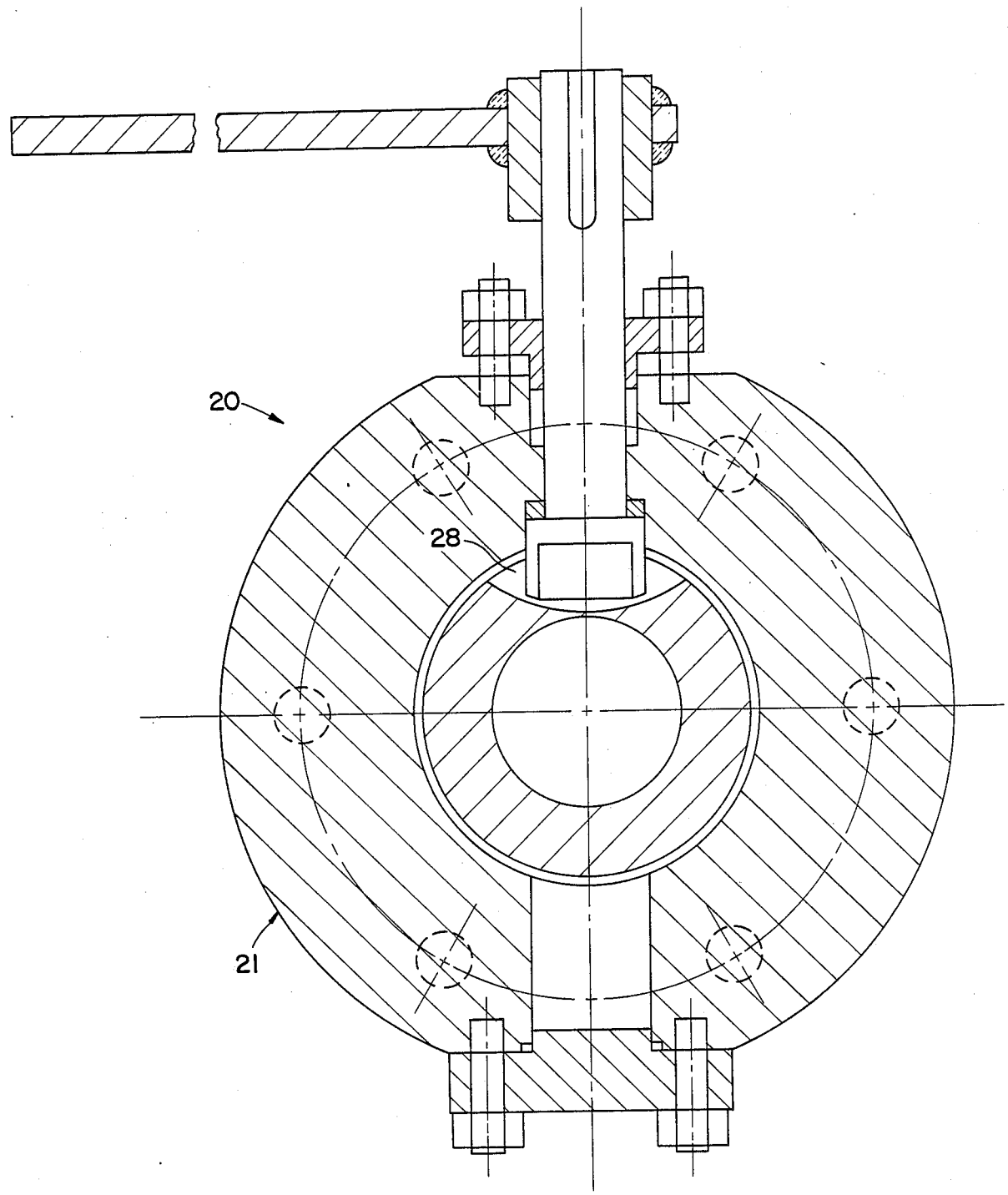
FIG. 2 is a cross-sectional view of the valve of FIG. 1, as seen along broken lines 2—2 thereof.

With reference now to a detailed description of the above described drawings, the valve shown in FIGS. 1 and 2, and indicated in its entirety by reference character 20, comprises a valve body 21 having a flowway 22 therethrough and a cavity 23 therein intermediate the flowway, and is adapted to be mounted within a flow line by any suitable means, such as flanges on opposite ends of the body. The valve also includes a ball closure 24 having a port 25 therethrough and rotatable within the cavity 23 between the open position of FIGS. 1 and 2 and a closed position in which the port 25 is disposed transversely across the axis of the flowway 22.

The ball closure is adapted to be moved between its opened and closed position by means of an operating stem 26 extending through an opening 26A in the upper end of the valve body and having a tongue 27 at its inner end which fits within a groove 28 across the upper end of the ball. More particularly, the tongue and groove extend in a direction transverse to the axis of the port, so that the ball is free to move axially with respect to the stem when the ball closure is in its closed position, thus enabling the ball closure to "float" and thus compensate for temperature fluctuations.

The stem is sealably mounted in the opening 26A by means of packing 29 received within a counterbore 30 in the upper end of the opening 26A and held down by a gland nut 31 bolted to the valve body. A flange 32 about the stem is received within a lower counterbore 33 of the stem opening 26 and a thrust bearing 34 is held between the upper end of the flange 32 and the upper end of the counterbore 33. Another opening 35 formed in the lower end of the valve body is of a size to pass the flange 32 of the stem so that, with the ball closure removed from the cavity, the stem may be moved upwardly into the opening 26A. Opening 35 is normally closed by a cap 36 bolted to the valve body. The stem is rotated by means of a suitable operator at its upper end.

The valve also includes a seat ring 37 which is carried within the cavity 23 of the valve body on one side of the ball closure and a spring ring 38 which is received within the cavity on the other side of the ball closure and engaged at its inner and outer diameters with the ball closure and valve body so as to yieldably urge the ball closure against the inner end of the seat ring. The seat ring has a lapped seating surface 39 on its inner end with which the ball closure is sealably engagable in the closed position of the ball closure to hold pressure from the right-hand direction.

The valve body 21 is made up of a main body portion 40 in which the right-hand end of flowway 22 and cavity 23 is formed and in which the stem 26 is rotatably mounted, and an end body portion 40A in which the left-hand end of the flowway 22 is formed. The seat ring is received in the open left hand end of the cavity formed in the main body portion, and end face 41 of the body portion 40A is disposed over the open end of the cavity 23 so as to engage with the outer end of the seat ring 37.

More particularly, the end portion of the body is releasably connected to the left-hand end of the main body portion which surrounds the opening in the guideway in the cavity by means of a circle of bolts 42 extending through bolt holes in a flange on the inner end of the end body portion and threadedly connected to holes formed in the left-hand end of the main body portion.

As shown, when the valve is assembled, the seat ring 37 is held between the end face of the end portion of the body and the left-hand end of the ball closure, and the ball closure in turn is held tightly against the spring ring 38 which is flexed about its inner and outer diameters to yieldably urge the closure member toward the seat ring. More particularly, the ball closure is held in a centered position within the cavity by means of engagement of its left side with the seating surface 39 of the seat ring and on its right side by engagement with the edge of the inner diameter of the spring ring 38. Upon removal of the bolts and end portion of the body, and with the stem rotated to a position closing the ball closure member, the seat ring and ball closure may be moved out through the open end of the cavity. If the spring ring is to be removed, it may be rotated downwardly along the bottom side of the cavity and then out through the open end of the guideway. The right-hand end of the cavity 23 is tapered inwardly toward the right-hand end of the valve body so as to form a relatively large space between it and the outer side of the spring ring 38, thereby providing a relatively large space which prevents the buildup of extraneous material which might otherwise hamper the operation of the valve.

As previously described, and for a purpose also previously described in connection therewith, the spring ring 38 shown in FIG. 1 has at least one hole 38A formed therein midway between its inner and outer diameters.

Figure 8:
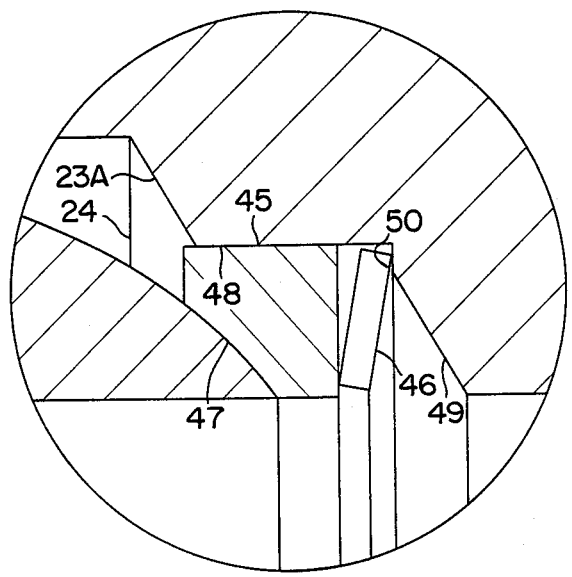
FIG. 8 is an enlarged, partial sectional view of another seat ring which is spring pressed into engagement with the other side of the ball closure in accordance with an alternative embodiment of the present invention.

In the alternative embodiment of the valve shown in FIG. 8, the right side of the ball closure is engaged by a centering ring 45 whose outer circumference is received closely within a recess 48 formed within the body cavity 23A. The centering ring is spring pressed against the ball closure by means of a spring 46 flexed and held tightly between the outer end of the seat ring and the end of a cavity 23A formed in the valve body. More particularly, the ring 45 has a lapped surface 47 on its inner end for metal-to-metal sealing engagement with the right-hand side of the ball closure and wiping across the ball closure as the closure moves between opened and closed positions, as well as a surface on its outer end which is normally spaced from the end of the recess for controlling the stack up of tolerances. The spring 46 is disposed opposite a tapered surface 49 on the right-hand end of the recess 48 to provide a large space between it and the surface 49. The outer diameter of the spring is engaged with a shoulder 50 formed at the intersection of the recess 48 and the tapered surface 49, and the inner diameter of the spring ring engages the seat ring near its inner diameter. The ring 45 is, of course, removable with the ball closure and the seat ring upon removal of the end portion of the valve body.

As previously described, the opposite ends of the valve body portions are sealed with respect to one another so as to prevent the passage of line fluid between them, and the seat ring is sealed with respect to the body so as to prevent line fluid from bypassing the seat ring in the closed position of the ball closure. Thus, in accordance with each of the embodiments of the invention shown in FIGS. 1 to 7, sealing means is confined and compressed into sealing engagement with the seat ring and body, and between and into sealing engagement with the body portions, as the end portion of the body is connected to the main body portion thereof. More particularly, and as also previously described, the seat ring and the end opening of the body cavity in each such embodiment have oppositely facing shoulders which limit axial movement of the seat ring to maintain the sealing means compressed into sealing engagement.

In the embodiment of the invention shown in FIGS. 1 and 2, the seat ring 37 has a flange 50 thereabout adjacent its outer side and received within a counterbore 51 formed in the outer end of the opening from the cavity in the main body portion. A shoulder 52 on the inner side of the flange faces oppositely to a shoulder 53 on the inner end of the counterbore, and a compressible seal ring 54 is confined between these shoulders in a position to be axially compressed into sealing engagement with them. The outermost end of the counterbore in the opening from the cavity has a notch 55 which forms a groove with oppositely facing surface on an outer end of the outer diameter of the flange and the end face 41 of the end portion of the body, and another compressible seal ring 55 is received within and axially compressed with the walls of the grooves. Thus, as the end portion of the body is bolted to the main body portion, the end face 41 of the end portion engages the outer end of the seat ring 37 to move it inwardly toward the ball closure, and the seal rings 54 and 55 are compressed into sealing engagement between the seat and main body portion and between the main body portion and end body portion. Thus, the shoulders of the grooves cooperate with the compressible seal rings to limit the inward movement of the seat ring in a right-hand direction while maintaining the desired compression on the seal rings.

Although the invention contemplates that other types of seal rings may be used, they are preferably of a resilient metal "O" ring type such as those manufactured and sold by the Helicoflex Company of Boontown, New Jersey, and referred to as "Helicoflex" seal rings.

In the alternative embodiment of the invention illustrated in FIG. 3 the downstream seat ring 60 has an outwardly extending flange 61 on its outer side opposite the face 41 of the end portion of the body and having its outer diameter received closely within a counterbore 62 in the opening of the cavity 23 in the main body portion, and its circumference 63 on its inner end received closely within the opening in cavity 23 inwardly of counterbore 62. A first seal ring 65 is confined within and compressible into sealing engagement with oppositely facing shoulders of a groove 66 formed by a notch at the intersection at the cavity 23 and counterbore 62 of the main body portion. A second seal ring 67 is confined within and compressed into sealing engagement between oppositely facing shoulders of a groove 68 formed by a recess in the end face 41 of the end portion of the body opposite the other end of seat ring 60. Thus, the seal rings 65 and 67 cooperate to prevent line fluid from passing between the end face 41 and end of the main body portion, as well as to prevent line fluid from bypassing the sealing engagement of the seat with the ball closure in the closed position. As in the case of the embodiment of FIGS. 1 and 2, the seal rings are compressed into sealing engagement as the end portion of the body is connected to the main portion thereof. The end face of the end body portion and end of the main body portion are spaced from one another, and the flange 61 absorbs the preload due to the bolts over and above that necessary to compress the seal rings.

In the embodiment of FIG. 4, the seal ring 70 has its outer circumference received closely within a counterbore 71 in the outer end of the opening from cavity 23, and a shoulder on its inner side faces oppositely to and engages a shoulder 72 at the intersection of the cavity opening with its counterbore 71 to limit inward movement of the seat ring. A single seal ring 74 is received within a "V" shaped notch at the intersection of the outer circumference of the seat ring and the counterbore 71 with the end face 41 of the end portion of the body. More particularly, the notches are formed between a tapered annular surface 75 at the intersection of the counterbore 71 and end of the outer body portion, and a tapered annular surface 76 at the intersection of the outer circumference of the seat ring and its outer end, both surfaces converging outwardly toward the left opposite the end face 41 of the end portion of the body. The single seal ring 74 is confined between and axially compressed into sealing engagement with the seat ring and each of the main and end body portions as the end body portion is bolted to the main body portion. Thus, this single ring performs the dual function of preventing line fluid from escaping from between the end face 41 and the end of the main body portion, and preventing line fluid from bypassing the seat ring in the closed position of the ball closure.

In the embodiment of FIG. 5, the seat ring 80 has a flange 81 on its outer side which fits closely within a counterbore 82 in the outer end of the opening from the cavity 23 of the main body portion. A first seal ring 83 is confined between and sealably engaged with a groove having shoulders 84 and 85 formed on the inner side of the flange and the intersection of the counterbore 82 with the opening from the cavity 23. A second seal ring 86 is received within a groove 87 formed by a recess in the outer end of the seat ring and compressed into sealing engagement between the recess and end face 41 of the end portion of the body intermediate the inner and outer diameters of the seat ring and thus radially inwardly from the intersection of the counterbore 82 with the end face. Thus, the seal rings 83 and 86 are adapted to be compressed into sealing engagement between the seat ring and main body portion and between the seat ring and end body portion as the end body portion is made up with the main body portion, thus cooperating to prevent line fluid from flowing between the end face 41 and the opposite end of the main body portion, as well as preventing line fluid from bypassing the seat ring when the closure member is in closed position.

In the embodiment of the invention illustrated in FIG. 6, a seat ring 90 has a flange 91 formed thereabout adjacent its outer end and fitting closely within a counterbore 92 formed in the outer end of the opening from the cavity 23. A shoulder 93 on the inner side of the flange engages with a shoulder 94 formed at the intersection of the counterbore with the cavity opening so as to limit inward movement of the seat ring. A first seal ring 95 is confined within a groove 96 formed by a recess in the end face 41 of the end body portion for sealably engaging between end face and the seat ring intermediate the inner and outer diameters of the seat ring. A second seal ring 97 is closely received in a groove 98 formed by a recess in the end face 41 of the end body portion for sealably engaging between the end portion and main portion of the body. Thus, as in the above described embodiments, the seal rings cooperate to not only prevent line fluid from escaping from between the main and end body portions, but also to prevent bypassing the seat ring when the ball closure is in closed position.

Figure 7:
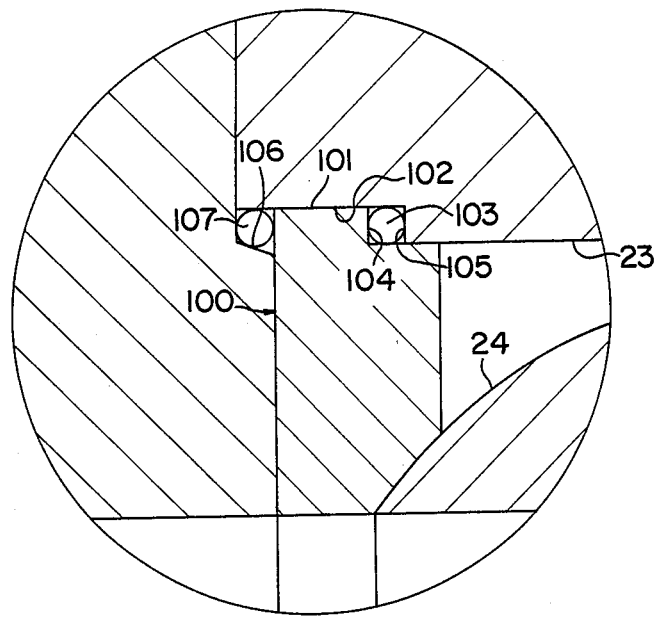

In the embodiment of the invention illustrated in FIG. 7, a seat ring 100 has a flange 101 thereabout on its outer side which is closely received within a counterbore 102 formed within the outer end of the opening from the cavity 23. A first seal ring 103 is confined and sealably engaged with shoulder 104 formed on the inner side of the flange 101 and a shoulder 105 formed on the main body portion at the intersection of its counterbore 102 with the end of the opening from the cavity 23, the oppositely facing shoulders 104 and 105 on the seat ring and main body portion cooperating with seal ring 103 to limit inward movement of the seat ring so as to maintain the seal rings in compressed sealing engagement.

In addition, the radially inner portion of the end face 41 of the end body portion is raised and fits concentrically within the counterbore 102 in the end of the cavity 23 to form a groove between a tapered shoulder 106 and the outer end of the counterbore as well as between the oppositely facing shoulders of the end face 41 outwardly of its raised portion and the outer side of the flange 101. More particularly, a second seal ring 107 is confined within the groove and radially compressed into sealing engagement between the shoulder 106 and the outer end of counterbore 102. Thus, as in the other embodiments, the seal rings cooperate to prevent the passage of line fluid between the end face 41 and end and main body portions, as well as to prevent bypassing of line fluid past the seat ring when the ball closure is closed.

Figure 9:
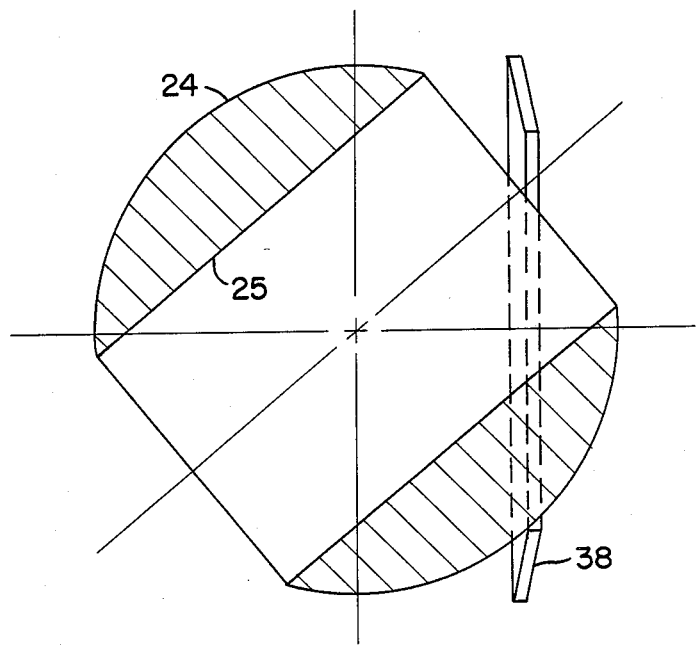
FIG. 9 is a cross-sectional view of the ball and spring ring of the valve of FIGS. 1 and 2, as seen along broken lines 9—9 of FIG. 1, and with the ball closure intermediate its opened and closed positions.
Figure 10:
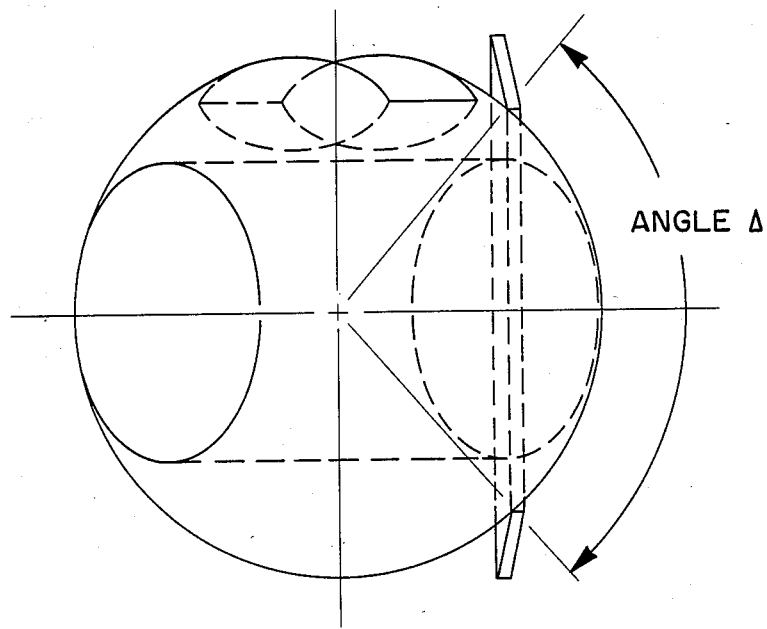
FIG. 10 is a side elevational view of the ball closure and spring ring, as seen from the lower side of FIG. 9.
Figure 11:
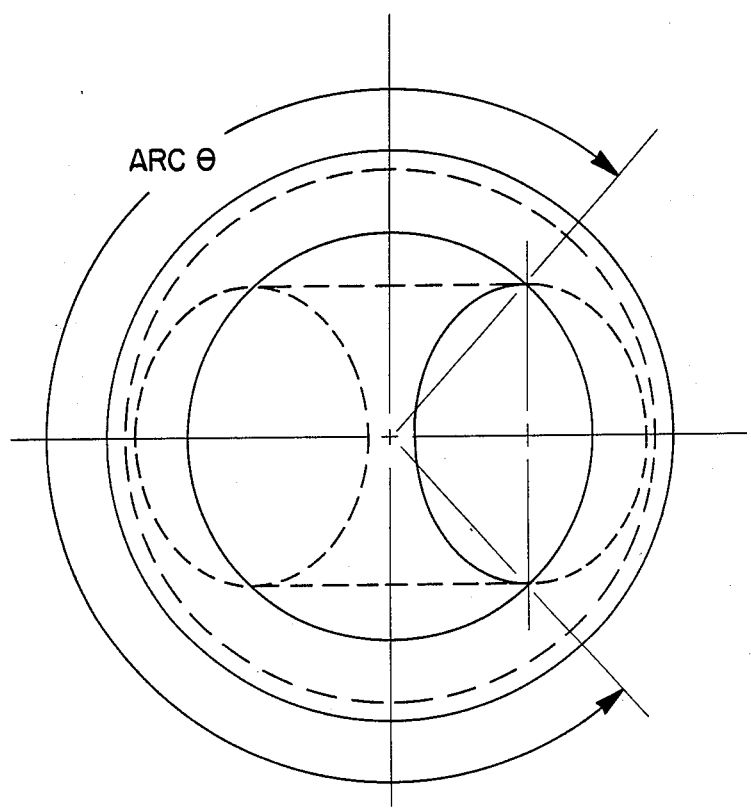
FIG. 11 is an elevational view of the ball closure and seat spring, as seen from the right side of FIGS. 9 and 10.

From the drawings, it can be seen that the inner diameter of the spring ring 38 is spaced outwardly from the end of the port 25 through the ball closure so that it has full circle contact with the ball closure in its opened position. It will also be understood that the inner diameter of the seat spring is less than the axial length of the port 25 through the ball closure so that it also has full circle contact with the ball closure in its closed position. The critical point in the support of the ball closure, so as to maintain the ball closure centered and properly loaded, occurs at the mid point of the passage of the end of the port over the inner diameter of the spring ring—i.e., when, as shown in FIGS. 9, 10 and 11, the end of the port is at such position that its diameter is intersected by the inner diameter of the seat spring. As previously discussed, and in accordance with one of the novel aspects of this invention, the inner diameter of the seat spring is so related to the diameter of the ball closure and the opening through the end of the port in the ball closure that approximately two thirds ($\frac{2}{3}$) or more of the surface of the ball closure, as indicated at arc $\theta$ in FIG. 11, is engaged with the inner diameter of the seat spring. Thus, we have found that, as long as that percentage of the surface of the ball closure is so engaged with the seat spring, the ball will not tend to hang up in the inner diameter of the seat spring as its port move past the inner diameter of seat spring during opening and closing of the ball closure.

More particularly, it is also important that the inner diameter of the seat spring not engage the ball closure too far up along its surface—i.e., too close to the vertical axis of the ball closure. We have also found that the inner diameter of the seat spring be so located relative to the surface of the ball closure that the angle $\Delta$ (FIG. 10) lying within a plane passing through the center of the ball and the intersection of the inner diameter of the seat spring with the ball surface be approximately ninety degrees (90°). When the angle is substantially less than ninety degrees (90°), the support of the ball may be unstable due to relatively small radial components of spring force acting on the ball closure, as well as due to large stack up tolerances in an axial direction.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A ball valve, comprising
   a valve body having a flowway therethrough including a cavity therein intermediate its ends,
   a ball closure having a port therethrough and rotatable within the cavity to open and close the flowway,
   a seat ring within the cavity on one side of the ball closure,
   means yieldably urging the ball closure against the seat ring,
   said body having a main portion with the cavity formed therein and opening to one end, to permit the ball closure, seat ring and urging means to be moved therethrough into and out of the cavity, and an end portion having an end face releasably connected to the end of the main body portion to hold the seat ring against the ball closure and thus the ball closure against the urging means,
   a stem rotatably mounted in the main body portion and having a tongue and groove connection with the ball closure for rotating the ball closure between open and closed positions while permitting the ball closure to move axially when in its closed position,
   said seat ring having an outer circumference which is closely received within the end opening in the cavity and an outer end which is tightly engaged by the end face of the end portion of the body, and
   resilient sealing means which is confined between and compressed into sealing engagement with the seat ring and the body and confined between and compressed into sealing engagement with the body portions, as the end portion of the body is connected to the main portion thereof, so as to prevent line fluid from passing between the end face of the end portion of the body and the end of the main body portion as well as prevent line fluid from bypassing the ball closure in its closed position,
   the outer circumference of said seat ring and the end opening in the body cavity having oppositely facing shoulders which limit axial inward movement of the seat ring to maintain said sealing means compressed into sealing engagement.

2. A ball valve as described in claim 1, wherein the sealing means comprises
   a first ring confined between and compressed into sealing engagement with the shoulders, and
   a second ring confined between and compressed into sealing engagement with the end face of the end body portion and end of the main body portion.

3. A ball valve as described in claim 1, wherein the sealing means comprises
   a first ring confined between and compressed into sealing engagement with the shoulders, and
   a second ring confined between and compressed into sealing engagement with the end face of the end body portion and outer end of the seat ring.

4. A ball valve as described in claim 1, wherein the sealing means comprises
   a first ring confined between and compressed into sealing engagement with the end face of the end body portion and the end of the main body portion, and
   a second ring confined between and compressed into sealing engagement with the end face of the end body portion and the outer end of the seat ring.

5. A ball valve as described in claim 1, wherein said sealing means comprises a seal ring confined between and compressed into sealing engagement with the end face of the end body portion, the end of the main body portion, and the outer end of the seat ring.

6. A ball valve as described in claim 1, wherein the urging means comprises
   a centering ring within the cavity on the other side of the ball closure, and
   a spring ring within the cavity and compressed between the centering ring and main body portion to urge the ball closure against the sea ring.

7. A ball valve as described in claim 1, wherein the urging means comprises
   a spring ring within the cavity and compressed between the ball closure and main body portion to urge the ball closure against the seat ring.

8. A ball valve, comprising
   a valve body having a flowway therethrough including a cavity therein intermediate its ends,
   a ball closure having a port therethrough and rotatable within the cavity to open and close the flowway,
   a seat ring within the cavity on one side of the ball closure,
   the spring ring having an inner and outer diameter and being received within the cavity with its outer diameter engaged with the main body portion and its inner diameter engaged with the ball closure, whereby a space is formed about the closure member between the seat ring and spring ring,
   said body having a main portion with the cavity formed therein and opening to one end, to permit the ball closure, seat ring and urging means to be moved therethrough into and out of the cavity, and an end portion having an end face releasably connected to the end of the main body portion to hold the seat ring against the ball closure and thus the ball closure against the spring ring,
   said spring ring being flexed about its diameters as the end body portion is connected to the main body portion to urge the ball closure against the seat ring,
   a stem rotatably mounted in the main body portion and having a tongue and groove connection with the ball closure for rotating the ball closure between open and closed positions while permitting the ball closure to move axially when in its closed position, and means sealing between the seat ring and valve body so as to prevent line fluid from passing between the end face of the end portion of the body and the end of the main body portion as well as prevent line fluid from bypassing the ball closure in its closing position, said spring ring having at least one hole formed therein to vent said space.

9. A ball valve as described in claim 8, wherein each said hole is formed in the spring ring generally midway between its inner and outer diameters.

10. A ball valve as described in claim 8, wherein said seat ring has an outer circumference which is closely received within the end opening in the cavity and an outer end which is tightly engaged by the end face of the end portion of the body, said sealing means comprises means which is confined between and compressed into sealing engagement with the seat ring and the body and confined between and compressed into sealing engagement with the body portions, as the end portion of the body is connected to the main portion thereof, and the outer circumference of said seat ring and the end opening in the body cavity have oppositely facing shoulders which limit axial inward movement of the seat ring to maintain said sealing means compressed into sealing engagement.

* * * * *